United States Patent [19]

Kelley

[11] Patent Number: 4,821,821
[45] Date of Patent: Apr. 18, 1989

[54] ELECTROSTATICALLY SHIELDED LABORATORY BALANCE

[75] Inventor: Louis E. Kelley, Wyncote, Pa.

[73] Assignee: Instruments for Research and Industry I²R, Inc., Cheltenham, Pa.

[21] Appl. No.: 242,627

[22] Filed: Sep. 12, 1988

[51] Int. Cl.⁴ .................... G01G 23/18; G01G 21/28
[52] U.S. Cl. .................... 177/181; 177/238
[58] Field of Search ................ 177/180–182, 177/238

[56] References Cited

U.S. PATENT DOCUMENTS 4,465,152  8/1984  Schmitter ..................... 177/180
4,789,034  12/1988  Luchinger et al. ............. 177/181

Primary Examiner—George H. Miller, Jr.
Attorney, Agent, or Firm—Paul Lipsitz

[57] ABSTRACT

An electronic microbalance shielded against static effects by surrounding the balance pan with a glass or plastic material which has an electrically conducting antistatic surface on the shield.

7 Claims, 1 Drawing Sheet

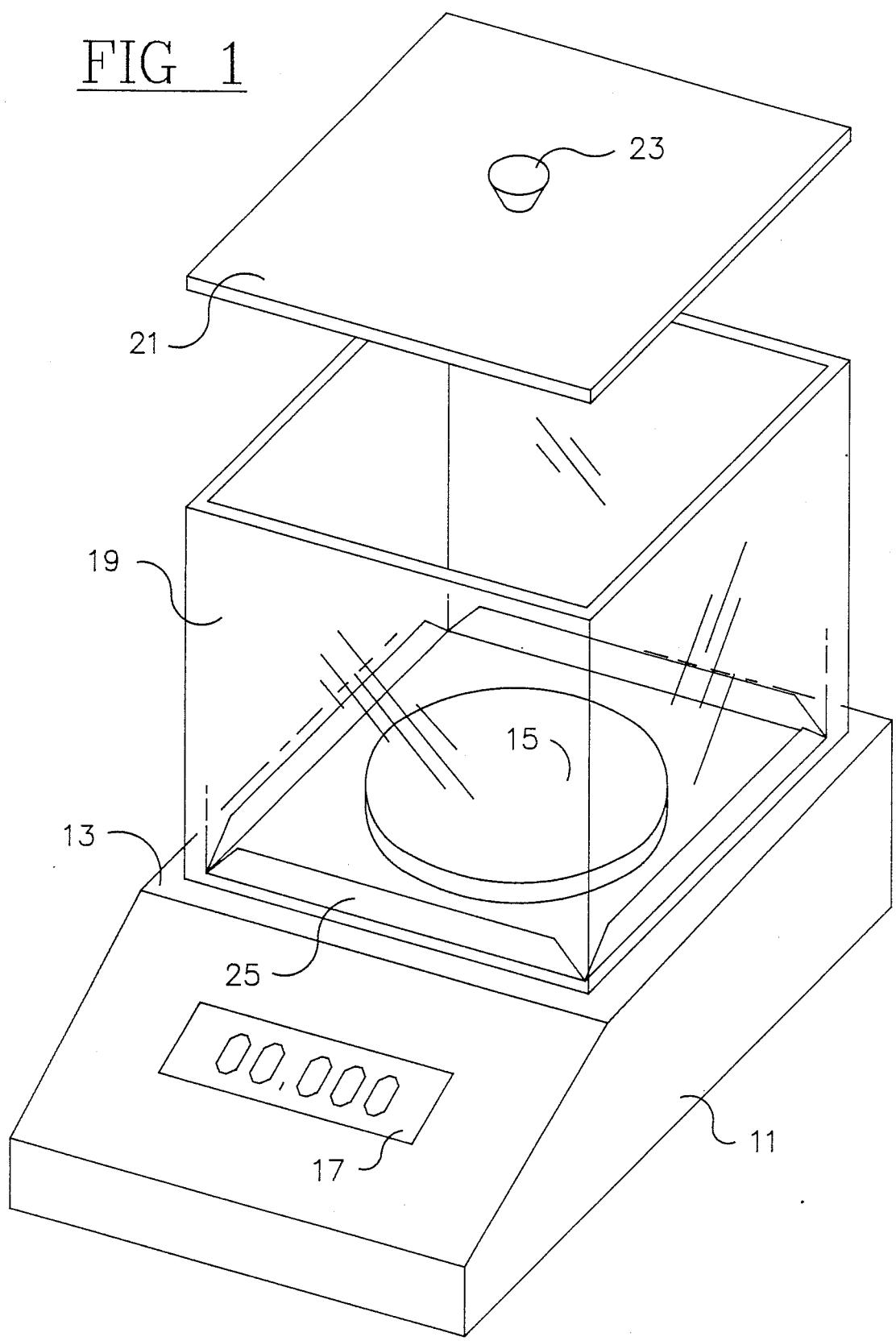

ELECTROSTATICALLY SHIELDED LABORATORY BALANCE

This invention relates to means to eliminate the static effects on sensitive balances, particularly top loading laboratory microbalances, by surrounding the balance pan with an electrically conductive antistatic shield.

BACKGROUND OF THE INVENTION

Laboratory balances, particularly microbalances, are extremely reactive to air movements, dust and also static charges. It is known to protect such balances with various types of shields and although the shields available are effective against air movement and dust, they are of little or no value when static charges develop on or around the balance or on the shield itself and such static charges cause considerable difficulty in obtaining accurate and reproducible weighings.

It is also known to dissipate static charges by using a small amount of radioactive material placed near the balance pan, but such a technique is frequently not an acceptable solution to the problem because of environmental hazards.

Another known technique for neutralizing static effects is the use of hydroscopic sprays or wipes, but such treatments have only temporary effects since they rapidly dissipate.

Metal shields have also been used to overcome static effects, but such shields are opaque and do not lend themselves to use with a balance where the operator needs to see the balance pan and its contents.

OBJECTS OF THE INVENTION

It is an object of this invention to provide a laboratory balance which is not only protected against dust and air movement, but which also is permanently immune from any static build-up.

It is a further object to provide an electrostatically shielded balance without using radioactive materials and which is environmentally safe.

Further objects will become obvious from the description of the invention.

BRIEF STATEMENT OF THE INVENTION

The invention comprises, in combination, a top, side or front loading balance and a structurally stable shield surrounding the balance pan and wherein the shield is constructed of glass or plastic which has an electrically conducting coating on the surfaces of the shield.

DISCUSSION OF PRIOR ART

As indicated above, shields for top-loading balances are known, but more shields, while effective against dust and air currents are not effective against static. As indicated above, metal shields for balances have also been used and although such shields can be effective against static, they are not of practical use because they are opaque and prevent visual observation of the balance pan and its contents. It is also known that conductive films or glass or plastic may be used for dissipating static charges on meter bezels or other viewing windows. In spite of this knowledge and the need for a transparent, static-free balance system, no effective means for protecting balances against static has been available heretofore.

DESCRIPTION OF THE DRAWINGS

The drawing is a perspective view of the invention showing the shield on the base of the balance with the top of the shield raised.

DETAILED DESCRIPTION OF THE INVENTION

Referring to the drawing, an electronic microbalance shown generally as 11 has a base 13, a balance pan 15, a four-sided metal apron or skirt 25 below and around the balance pan, and a read-out section 17. Resting on the base 13 and surrounding the balance pan 15 is a shield 19 comprised of four sides as shown and a top 21. The shield itself has not bottom, but rests on the base of the balance as shown. The top is fitted with a knob 23 so that it may be raised (as shown) to enable placement of materials to be weighted on the balance pan. In use, however, the top or lid 21 rests on the shield and becomes an integral part of it. Alternatively, the top 21 may be hinged on one of the sides for raising and lowering or the top may be permanently affixed and the front face or a side face hinged for front or side loading.

The shield and its top and made of glass or, preferably, an essentially transparent plastic material such as a polymethylmethacrylate, polycarbonate, polystyrene, or similar material and will be of a thickness so as to have structural stability. Less preferred, but useful in the invention is a shield made of opaque material such as carbon filled polyvinylchloride having a window through which to view the balance pan and wherein the window is made of an essentially transparent glass or plastic having the electrically conductive coating. The plastic material used to construct the shield will have been coated with an antistatic coating preferably by high vacuum evaporation or other known technique and the coated sides of the plastic will form the inside of the shield. Permanent antistatic coatings for glass or plastics ar usually comprised of metals such as gold, rhodium, or other appropriate metal and, for use as the shield of the invention, will be applied to be neutral in color with about 82% to about 88% light transmission. Surface resistivity of the coating will be from about 0.1 to about 10 megohms per square with static shielding being optimum at about 0.1 megohms per square. These antistatic coatings are non-reactive, non-oxidizing, and permanently conductive. The conductive coating which is applied to the glass or plastic shield material is quite thin and although it maya be discontinuous, it must provide a continuous electrical path to ensure rapid dissipation of any electrical charge.

In order for the shielded balance to be effectively protected from static charges the shield and its top must surround the balance pan. When the top of the shield is removed static effects are frequently observed and weighing is difficult. With the top in position, however, the static effects are entirely removed and weighing is readily achieved. It is also necessary for maximum effectiveness of the shield that some part of the surface of the coating on the shield be in contact with a metal or other electrically conducting part of the balance. In many balances, a metal skirt or apron is position below the pan and simply having the coated surface of the shield touch the apron or skirt is sufficient. For example, the drawing illustrates a top loading balance with an apron 25 around the pan. A can be seen from the drawing, the shield surrounds the apron and the inside bottom front portion of the shield touches that apron.

With balances having no apron, skirt, or other electrically conducting part for the inside of the shield to touch, the skilled art working will readily supply conducting means from the inside surface of the shield to a metal part on the balance.

It will be understood that the shield for the balance pan may have more than four sides as shown in the drawing and may be constructed to fit any particular balance. Other changes and modifications may be made by the skilled art workers without departing from the spirit and scope of the invention.

I claim that:

1. In combination, a top loading microbalance and an electrostatic shield therefor comprising an electronic balance having a balance pan adapted for top, side or front loading and a shield surrounding said balance pan, said shield comprised of structurally stable glass or plastic having an electrically conducting coating on the surfaces of said shield, said coating being in contact with an electrically conducting part of said balance and wherein said glass or plastic is essentially transparent or has means to visually view said balance pan and its contents.

2. The combination of claim 1 wherein the shield is comprised of carbon filled polyvinylchloride.

3. In combination, a top loading microbalance and an electrostatic shield therefor comprising an electronic balance having a balance pan adapted for top, side or front loading and a shield surrounding said balance pan, said shield comprised of structurally stable glass or plastic having an electrically conducting coating on the surfaces of said shield, and said coating being in contact with an electrically conducting part of said balance.

4. The combination of claim 3 wherein the electrically conducting coating is evaporated on the inside surfaces of said plastic.

5. The combination of claim 4 wherein the surface resistivity of said coated plastic is from about 0.1 to about 10 megohms per square.

6. The combination of claim 5 wherein the electrically conducting coating is gold or rhodium.

7. The combination of claim 5 wherein the plastic is ploymethylmethacrylate.

* * * * *